United States Patent [19]

Radossi

[11] Patent Number: 5,327,929
[45] Date of Patent: Jul. 12, 1994

[54] PLUG VALVE

[75] Inventor: Sergio Radossi, Cresskill, N.J.

[73] Assignee: Hoke Incorporated, Cresskill, N.J.

[21] Appl. No.: 972,941

[22] Filed: Nov. 6, 1992

Related U.S. Application Data

[62] Division of Ser. No. 751,525, Aug. 29, 1991, Pat. No. 5,188,144.

[51] Int. Cl.[5] .................... F16K 43/00; F16K 11/085
[52] U.S. Cl. .................................. 137/315; 251/309; 251/312
[58] Field of Search ............... 137/315; 251/309, 312, 251/315, 310, 311

[56] References Cited

U.S. PATENT DOCUMENTS

| | | | |
|---|---|---|---|
| 904,299 | 11/1908 | Best | 251/309 |
| 2,433,732 | 12/1947 | Brown | 251/309 |
| 2,493,966 | 1/1950 | Hartley | 251/312 |
| 2,857,130 | 10/1958 | Brisbane | 251/309 |
| 2,864,579 | 12/1958 | Stoltenberg | 251/309 |
| 2,913,219 | 11/1959 | Freed | 251/312 |
| 3,226,080 | 12/1965 | Lowrey | 251/309 |
| 3,232,579 | 2/1966 | Jeffrey | 251/312 |
| 3,233,865 | 2/1966 | Panzica et al. | 251/309 |
| 3,423,067 | 1/1969 | Foster | 251/309 |
| 3,484,078 | 12/1969 | Haenky | 251/312 |
| 3,918,680 | 11/1975 | Stevens, Jr. | 251/312 |
| 4,015,816 | 4/1977 | Semon | 251/309 |
| 4,262,880 | 4/1981 | Danko et al. | 251/309 |
| 5,117,854 | 6/1992 | Eve | 137/315 |

Primary Examiner—George L. Walton
Attorney, Agent, or Firm—Stoll, Miskin, Previto & Hoffman

[57] ABSTRACT

A plug valve having a body with an inlet, an outlet and a plug-receiving opening which intersects the inlet and outlet. A plug is mounted in the opening and has an outer wall and an orifice extending therethrough. The plug is movable from an operative position in which the orifice connects the inlet to the outlet to allow fluid to flow to an inoperative position in which the orifice is disconnected from the inlet and outlet to prevent the flow of fluid from the inlet to the outlet. The plug outer wall has a seal-receiving portion which is spaced from the orifice and which is adapted to removably receive a seal retainer assembly. A seal is interposed between the seal-receiving portion of the plug and at least a portion of the seal retainer assembly to form a seal.

3 Claims, 6 Drawing Sheets

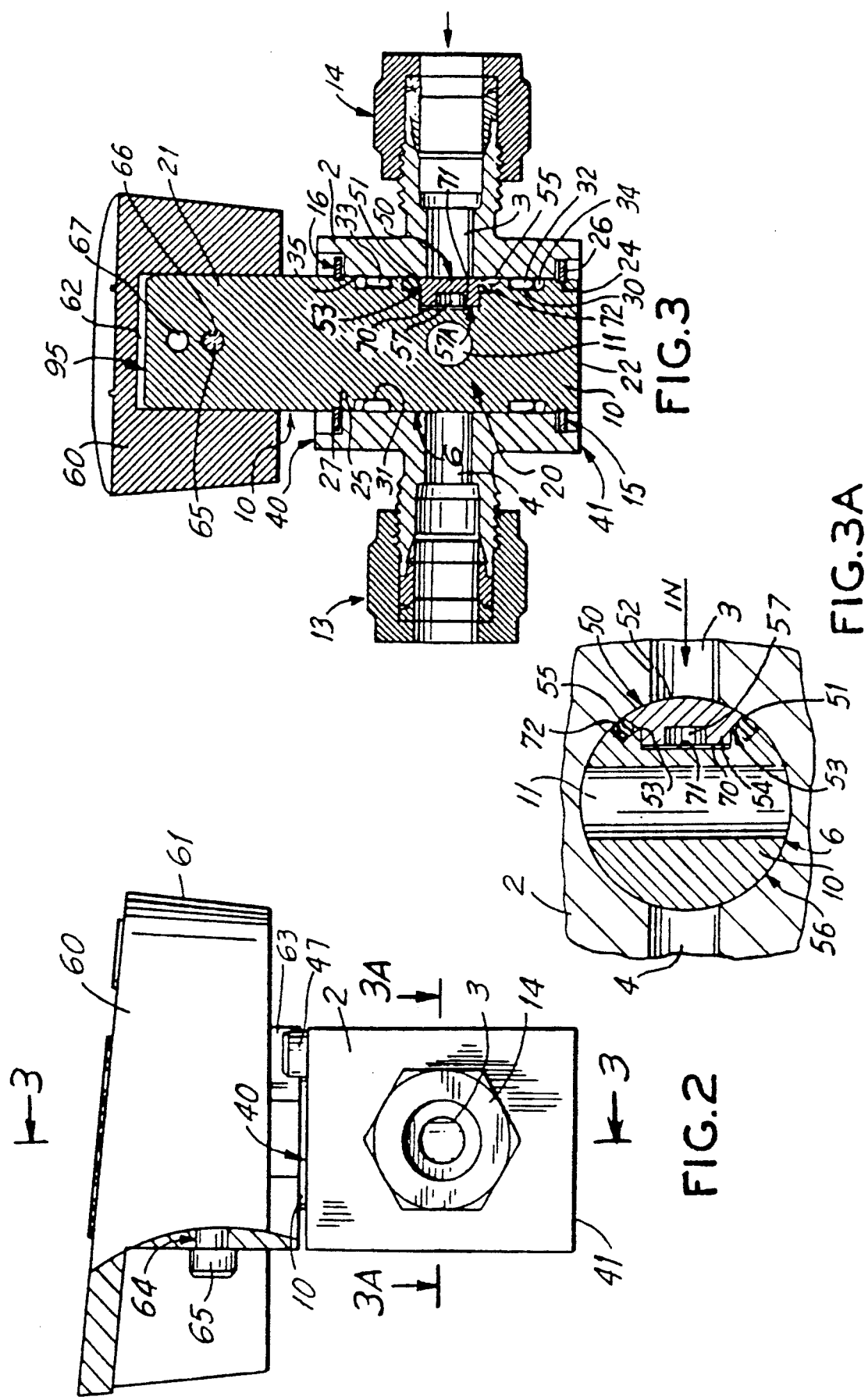

PLUG VALVE

This application is a division of pending U.S. application Ser. No. 07/751,525 filed Aug. 29, 1991, now U.S. Pat. No. 5,188,144.

BACKGROUND

The present invention relates to a plug valve and more particularly to a rotary plug valve which has a sealing ring on the surface of the plug to form a secure leakproof seal.

Plug valves are comprised of a valve body having an inlet and an outlet in axial alignment with each other and a plug opening intersecting the inlet and outlet. The plug opening is adapted to receive a plug which has an orifice therein adapted to be placed into axial alignment with the inlet and outlet to connect the two and thereby form a passageway for fluid to pass from the inlet through the orifice and to the outlet. The plug is adapted to be rotated to all inoperative position wherein the orifice is out of axial alignment with the inlet and outlet to disconnect the two and thereby stop the flow of fluid from the inlet to the outlet. In such plug valves a sealing ring (preferably an O-ring) is removably mounted in a sealing ring-receiving cavity on the plug wall to form a seal when the plug is rotated to its inoperative position. To replace the sealing ring the plug is removed from the housing and a new sealing ring is placed in the ring-receiving groove in the plug wall.

It has been found that in some existing plug valves, the sealing ring may not be easily replaced. In other valves, it is not possible to determine the direction of the flow from the position of the handle. Moreover, some existing plug valves do not have instant control of the flow while others are not multifunctional and do not have throttling capabilities. Furthermore, such existing plug valves may be inadvertently actuated which may be a safety hazard and others do not provide backup sealing rings. Moreover, it is difficult (if not impossible) for existing plug valves to be capable of being both panel and base mounted. In still others, the plug may be removed if the handle is missing. Some plug valves do not have straight through orifices so that maintenance, and especially roddability, is difficult. In other plug valves, it may be difficult to use standard O-rings.

OBJECTS

The present invention overcomes these drawbacks and has for one of its objects the provision of an improved plug valve in which the sealing ring may be easily removed and replaced.

Another object of the present invention is the provision of an improved plug valve in which the sealing ring may be easily mounted and removed from the outer wall of the plug.

Another object of the present invention is the provision of an improved plug valve in which a sealing retainer is removably attached to a cavity in the plug wall.

Another object of the present invention is the provision of an improved plug valve in which the valve may be either panel mounted or base mounted.

Another object of the present invention is the provision of an improved plug valve in which the plug orifice is a straight through orifice to permit full flow of the fluid and to improve maintenance and roddability.

Another object of the present invention is the provision of an improved plug valve in which the position of the handle will indicate the direction of the flow and in which the direction of flow may be indicated even if the handle is missing.

Another object of the present invention is the provision of an improved plug valve in which plug removal is prevented even if the handle is missing.

Another object of the present invention is the provision of an improved plug valve in which the valve is a 90° on-off position to permit instant control of the flow.

Another object of the present invention is the provision of an improved plug valve which is multi-functional and has throtting capabilities.

Another object of the present invention is the provision of an improved plug valve wherein backup sealing rings may be used.

Another object of the present invention is the provision of an improved plug valve wherein standard O-rings may be used which may be made of any preferred material, such as polypropolene.

Other and further objects of the invention will be obvious upon an understanding of the illustrative embodiment about to be described, or will be indicated in the appended claims and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings forming a part of the specification, wherein:

FIG. 2 is a side elevational view of the assembled plug valve of the present invention.

FIG. 3 is a sectional view taken along line 3—3 of FIG. 2.

FIG. 3A is a partial sectional view taken along line 3A—3A of FIG. 2.

DESCRIPTION

Figure 1:
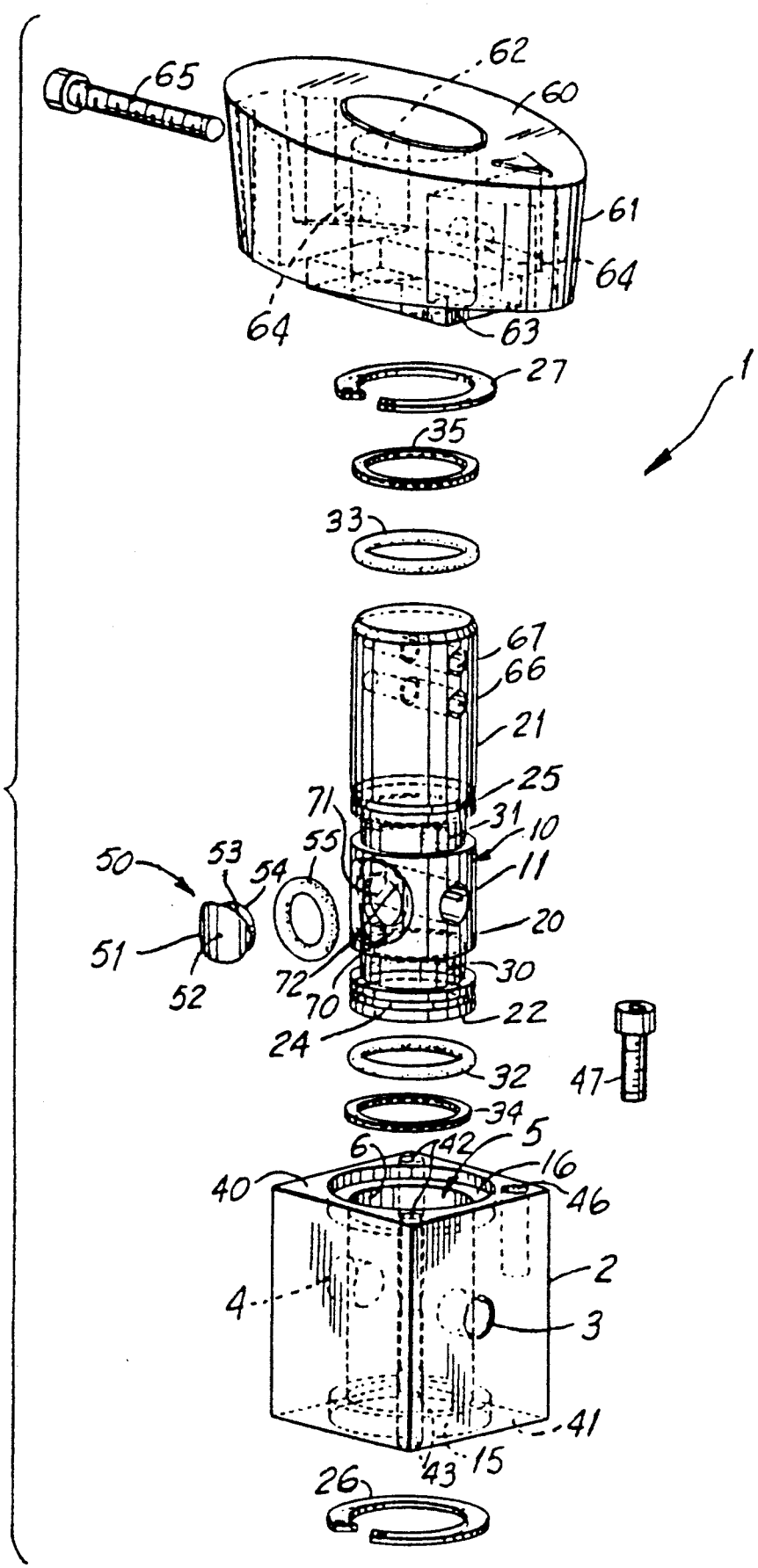
FIG. 1 is an expanded perspective view of a plug valve made in accordance with the present invention.

Referring to the drawing and more particularly to FIG. 1, the plug valve 1 comprises a metal body assembly 2 having an inlet 3 and outlet 4 in axial alignment with each other and having a cylindrical plug receiving opening 5 at right angles to and intersecting the inlet 3 and the outlet. A cylindrical plug assembly 10 is adapted to be placed within the opening 5 of the body 2 and has a horizontal orifice 11 extending therethrough. The orifice 11 is on the same axial plane as the axial plane of the inlet 3 and the outlet 4. As is usual in such plug valves, when the plug 10 is rotated to its operative position, the orifice 11 is in axial alignment with the inlet and outlet 3–4 so as to allow fluid to move from the inlet 3 to the outlet 4. By rotating the plug 10, the orifice 11 is moved out of axial alignment with the inlet and the outlet 3–4 to prevent any fluid from moving therethrough. The body 2 may have the usual couplings 13–14 connecting the inlet and the outlet 3–4 to different parts of the system in which the plug valve 1 is to be used. The upper and lower ends of the opening 5 in the body 2 are provided with lower and upper expanded portions 15 and 16.

The plug 10 is preferably a one-piece metal plug and has an upper actuating portion 21 and a lower operative portion 20 with orifice 10 located in the lower operative portion 20. The plug 10 has substantially flat bottom and top faces 22–95 respectively. Adjacent the bottom face 22 of the plug 10 there is provided a retaining circular groove adapted to receive retaining ring 26. Interposed between upper plug portion 21 and lower plug portion 20 is a retaining circular groove 25 adapted to receive retaining ring 27. The retaining rings 26–27 are adapted to sit in the expanded portions 15–16, respectively. When the two retaining rings 26–27 are in place in the grooves 24–25 the plug 10 remains securely in place within the body 2 and cannot move axially, even if the handle 60 is removed.

The plug 10 is also provided with a pair of spaced upper and lower sealing grooves 30–31. The sealing grooves 30–31 are adapted to receive sealing O-rings 32–33, respectively, as well as backup sealing rings 34–35, respectively, which may be TFE. The rings 32–35 will form a seal with the inner walls 6 of the opening 5 in the body 2 to prevent leakage.

The upper and lower faces 40–41 of the body 2 have diametrically opposed screw openings 42–43, respectively, to receive screws 44–45, respectively, for panel or base mounting of the valve as will be further discussed herein-below. In addition, a stop screw opening 46 is provided in the top face 40 of the base to receive a stop screw 47 which is adapted to stop the movement of the handle 60 as will be more fully described hereinafter.

The handle 60 of the plug valve 1 is preferably oval shaped with the pointed end 61 in line with the orifice 11 in plug 10 so as to point to the direction of flow. The handle 60 is mounted on the upper portion 21 of the plug 10 which sits in a cavity 62 therein. The handle 60 has a stop surface 63 adapted to strike the stop screw 47 in order to limit the rotation of the plug 10 to 90° turns.

A horizontal screw opening 64 is provided in handle 60 adapted to receive a screw 65. The upper portion 21 of plug 10 has a pair of horizontal screw openings 66–67 through which the screw 65 may extend to hold the handle in place. The two screw openings 66–67 permit the handle 60 to be positioned high or low on the plug 10.

A separate metal (or some other hard material) retainer assembly 50 is provided for removable attachment to a cavity 70 in the outer wall 5 of the plug 10. The retainer 50 has a generally oval cap portion 51 with a curved outer surface 52 and a generally cylindrical body portion 54 extending therefrom. The body portion 54 is diametrically smaller than the cap 51 to form a circumferential ledge 53 at the juncture of the cap 51 and body portion 54. A sealing ring 55, preferably in the form of an O-ring, is adapted to sit in the ledge 53 of the retainer 50. The retainer 50 may be either solid or may have a cavity 57 in its base 57A which is preferably flat.

The side wall of the plug 10 has a cylindrical cavity 70 adapted to receive the retainer 50. The cavity 70 has a flat base 71 and a generally cylindrical groove 72 which surrounds the base 71 and follows the curve of the wall 56 of plug 10. The O-ring 51 is placed beneath the ledge 53 in retainer 50 and the retainer 50 is placed in cavity 70 in plug 10. The curved outer surface 52 of retainer 50 also follows the curve of the plug wall 56. The body portion 54 is pressed or snapped into cavity 70 and the O-ring 55 is compressed between the ledge 53 and the groove 72 in the cavity 70. With the retainer 50 in the cavity 70, when the plug 10 is turned to the off position (FIGS. 3 and 3A), the retainer 50 is in the path of the fluid flow from inlet 3 and O-ring 55 is compressed to form a seal to prevent any fluid from leakage.

With this structure when the O-ring 55 is to be replaced, it is merely necessary to lift the plug 10 out of the body opening 5 and to remove the retainer 50 with the used O-ring 55 from the cavity 70 and replace it with a new retainer 50 having a fresh O-ring 55. It will be seen that this operation can be accomplished quickly and easily.

Figure 10:
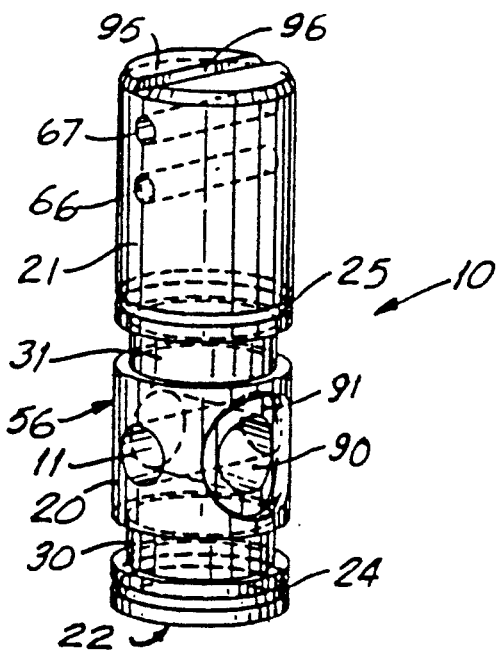
FIG. 10 is a perspective view showing another embodiment of the invention in the form of a modified plug for the valve.
Figure 10A:
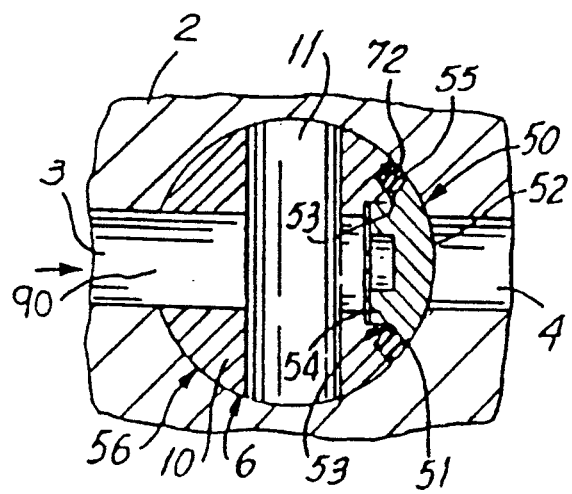
FIG. 10A is a partial sectional view of the plug valve shown in FIG. 10 in its operative position.

In the embodiment of the plug 10 shown in FIGS. 10 and 10A an auxiliary cylindrical orifice 90 is formed in the plug 10 which intersects the main orifice 11. The auxiliary orifice 90 has a groove 91 on wall 56 surrounding the orifice 90. The retainer 50 is snapped into the auxiliary orifice 90 so that the body 54 lies in auxiliary orifice 90 to compress the O-ring 55 between groove 91 and ledge 53 in retainer 50. When the plug 10 is rotated to the off position, the auxiliary cavity 90 and its retainer 50 is placed facing the outlet 4. The flow of fluid from the inlet 3 will strike the base 57A to push the retainer 50 against inner wall 16 in body 2 and compress the O-ring 55 to form a seal. In this embodiment, the top wall 95 of the upper portion 21 of plug 10 has a groove 96 therein aligned with orifice 11 so as to indicate direction of flow if the handle 60 is missing.

Figure 11:
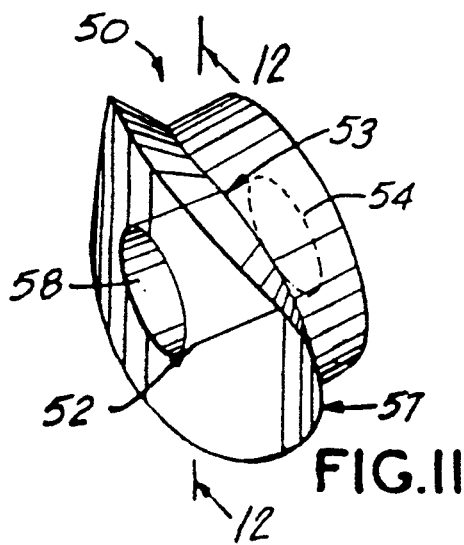
FIG. 11 is a perspective view showing a modified retainer which may be used with the plug valve of FIG. 1.
Figure 12:
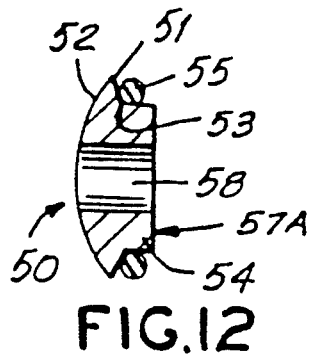
FIG. 12 is a sectional view taken along line 12—12 of FIG. 11.
Figure 13:
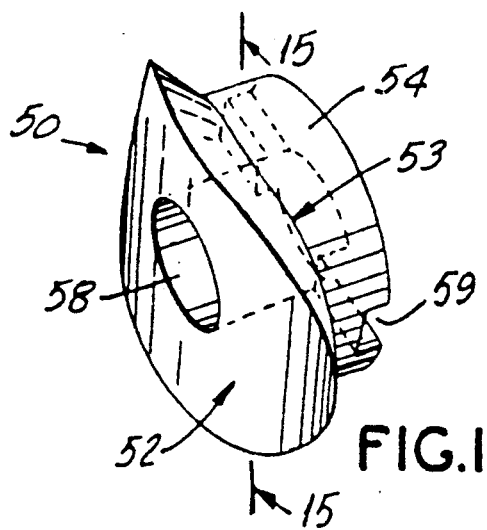
FIG. 13 is a perspective view showing another modified retainer which may be used with the plug valve of FIG. 1.
Figure 14:
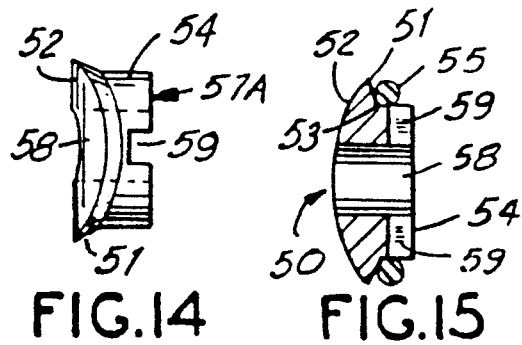
FIG. 14 is a side elevational view thereof.
Figure 15:
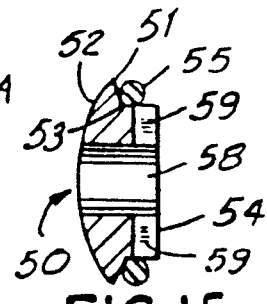
FIG. 15 is a sectional view taken along line 15—15 of FIG. 13.
Figure 16:
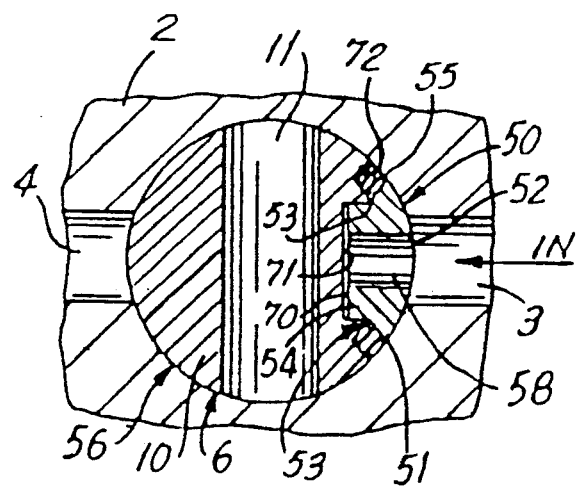
FIG. 16 is a partial cross-sectional view of a plug valve showing the retainer of FIGS. 11–12 in operation.
Figure 17:
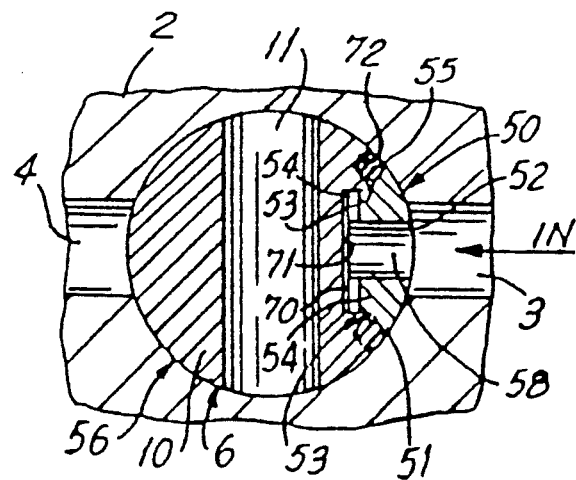
FIG. 17 is a partial cross-sectional view of a plug valve showing the retainer of FIGS. 13–15 in operation.

In the embodiment shown in FIGS. 11, 12 and 16, the retainer 50 has a cylindrical opening 58 through the center at the body 54. It is adapted to be used with the plug 5 shown in FIGS. 1–3. It is placed in the cavity 70 in the plug wall 56 and the O-ring 55 compressed is between ledge 53 and groove 72. When the plug 10 is turned to the off position (FIG. 16) fluid will enter the opening 58 and seep around the curved wall 52 to compress the O-ring 55 and form a seal.

In the embodiment shown in FIGS. 13–15 and 17 which is also adapted to be used with a plug similar to the plug shown in FIGS. 1-3, the retainer 50 not only has a central opening 58 in its body 54 in a manner similar to FIGS. 11-12 and 16, but also has side channels 59 at right angles to the opening 58 on the edge 57A of the body 54. This permits fluid to move through the central opening 58 and side channels 59 to apply pressure to the O-ring and form a seal.

Figure 8:
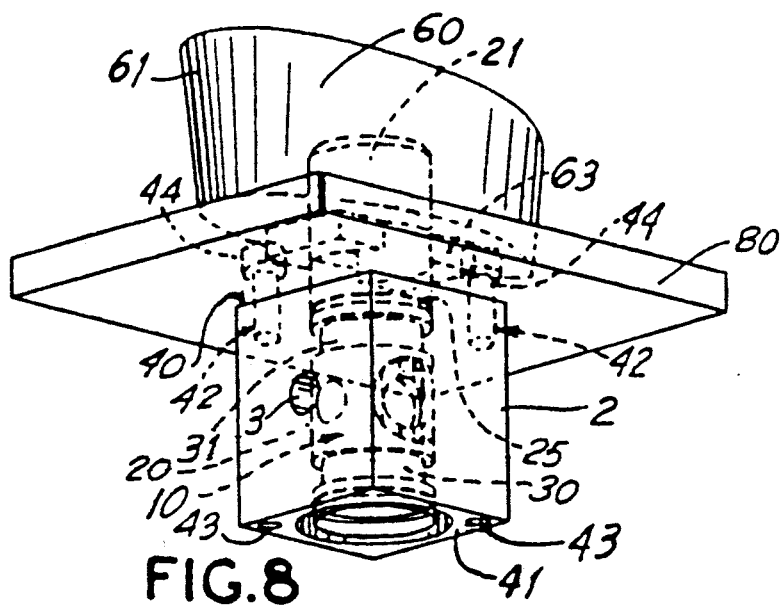
FIG. 8 is a perspective view showing panel mounting of the plug valve.
Figure 8A:
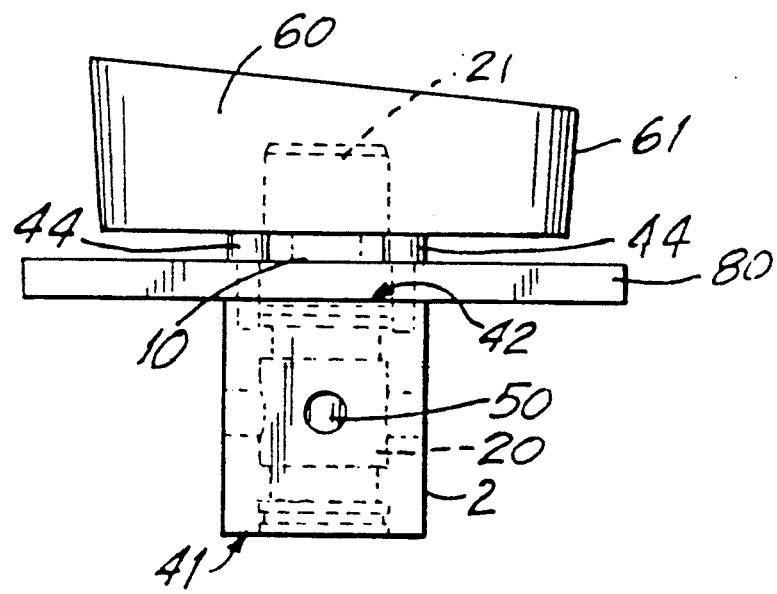
FIG. 8A is an elevational view of the panel mounting shown in FIG. 8.

The plug valve 1 of the present invention may be panel mounted as shown in FIGS. 8 and 8A. To accomplish this, the handle 60 is removed and the plug is inserted from the bottom through a support surface 80. The screws 44 are inserted into the top 40 of body 2 from the top and through the surface 80 and into the screw openings 42 in order to hold the plug valve in place. The handle 60 is then replaced. It will be noted that the plug valve 1 is hidden from view in this embodiment.

Figure 9:
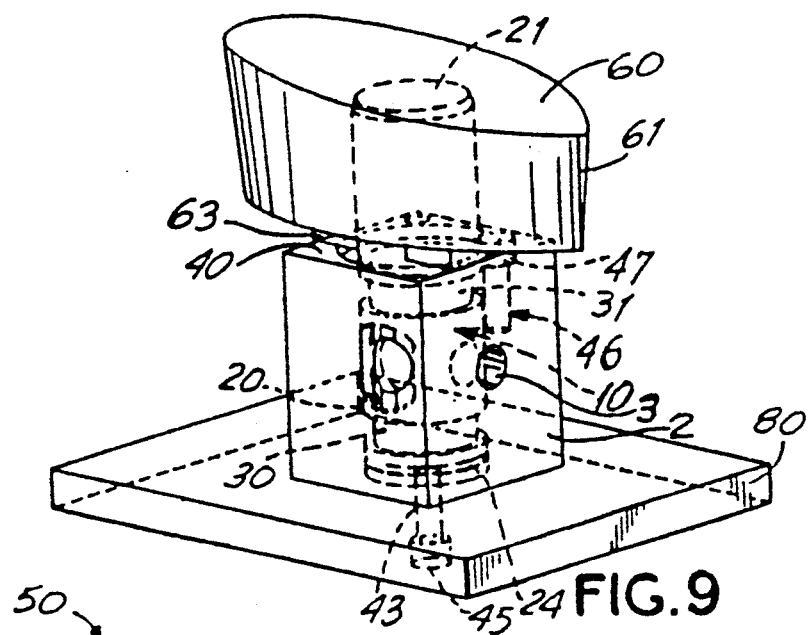
FIG. 9 is a perspective view showing base mounting of the plug valve.
Figure 4:
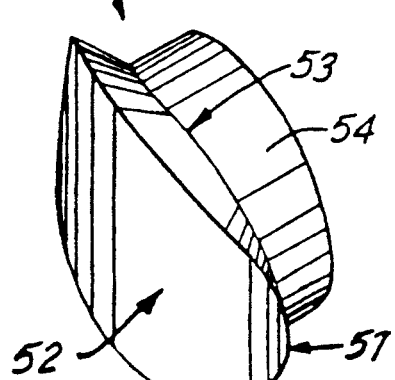
FIG. 4 is a perspective view showing the preferred retainer of the present invention.
Figure 5:
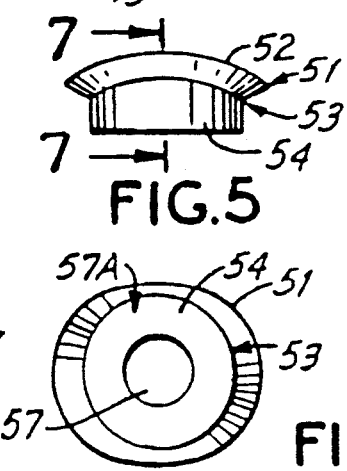
FIG. 5 is an elevational view thereof.
Figure 7:
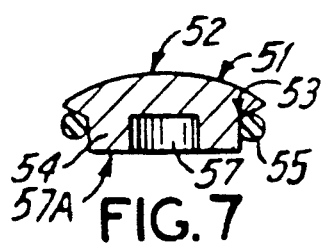
FIG. 7 is a sectional view taken along line 7—7 of FIG. 5.
Figure 6:
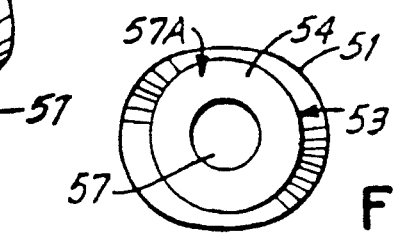
FIG. 6 is a bottom view thereof.
Figure 9A:
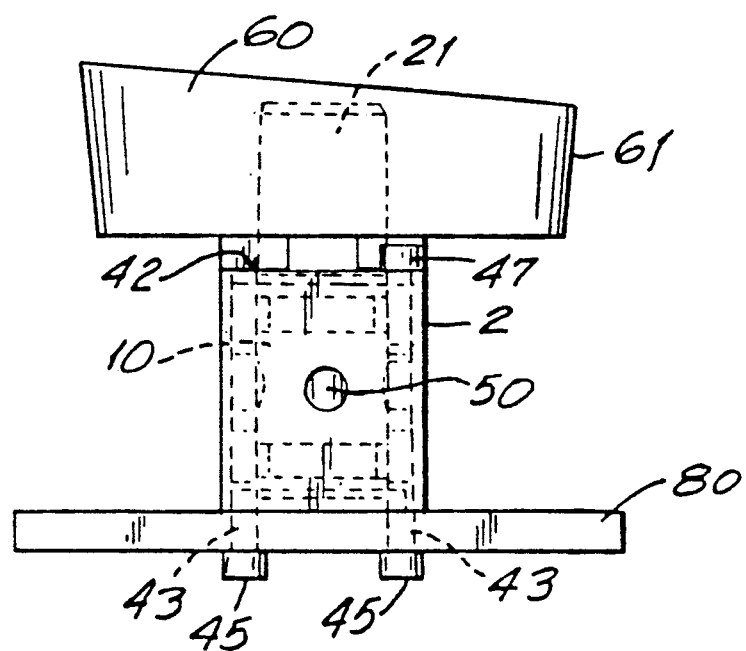
FIG. 9A is an elevational view of the base mounting shown in FIG. 9.

Alternately, the plug valve 1 may be base mounted as shown in FIGS. 9 and 9A. In this embodiment, the plug valve 1 is placed on top of the support surface 80. The screws 45 extend through the surface 80 from the bottom and into the screw openings 43 in the lower face 41 of the body 2.

It will thus be seen that the present invention provides an improved plug valve in which the sealing ring may be easily removed and replaced from the plug valve and in which the sealing ring retainer may be attached either to the wall of the plug or a secondary orifice intersecting the main orifice in the plug. The present invention also provides a removable retainer which is removably attached to a cavity in the plug wall.

The plug valve also provides for the handle to indicate the direction of the flow and in which a 90° on-off position permits instant control of the flow. The plug is multi-functional, has throttling capabilities and permits the use of backup retainer rings. The orifice is a straight through orifice to give full flow and to increase roddability.

In addition, the present invention provides an improved plug valve in which standard O-rings may be used which can be made of any preferred material such as polypropolene.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A plug valve body comprising an inlet and an outlet, said body having a plug-receiving opening therein intersecting said inlet and outlet, said valve body having top and bottom faces through which the plug-receiving opening extends, means to base mount the valve body, said base mounting means comprising means to permit the valve body to be attached to a support surface from the bottom of the valve body, said top face having means to panel mount the valve body, said panel mounting means comprising means to permit the valve body to be attached to and depend from a support surface from the top of the valve body, said means comprising screw openings in the top and bottom faces of the valve body in order to receive screws whereby the valve body may be attached to a support surface either from the bottom and the top position to give the valve plug body versatility depending on the installation requirements at the valve plug body site.

2. A plug valve body as set forth in claim 1, wherein means are provided for holding a plug in the plug-receiving opening in the valve body, said holding means comprising retainer means mounted in shoulder means in the top and bottom faces of said valve body for cooperation with grooves in a plug mounted in the plug-receiving opening.

3. A plug valve body as set forth in claim 1, wherein stop means are provided on the body to prevent rotation of a plug more than 90°.

* * * * *